United States Patent [19]

Palumbo

[11] 4,080,750
[45] Mar. 28, 1978

[54] TOY AIRCRAFT

[76] Inventor: Arnaldo Palumbo, Via Cristoforo Colombo, Trezzano sul Naviglio (Milan), Italy

[21] Appl. No.: 691,074

[22] Filed: May 28, 1976

[30] Foreign Application Priority Data

Jan. 29, 1976 Italy .............................. 20563/76[U]

[51] Int. Cl.² ...................... A63H 33/00; A63H 27/04
[52] U.S. Cl. ..................................... 46/1 R; 273/95 B
[58] Field of Search ................. 46/1 R, 100, 216, 207; 272/133; 273/95 B, 95 AA, 106 E, 101

[56] References Cited

U.S. PATENT DOCUMENTS

| 2,388,513 | 11/1945 | Zwickel | 273/95 B |
| 2,634,127 | 4/1953 | Shapiro | 273/95 B |
| 2,969,608 | 1/1961 | Shapiro | 273/95 B |
| 3,027,683 | 4/1962 | Shapiro | 273/95 B |
| 3,893,256 | 7/1975 | Wolf et al. | 46/1 R |

FOREIGN PATENT DOCUMENTS 930,015  7/1955  Germany ............................... 46/216

Primary Examiner—F. Barry Shay
Attorney, Agent, or Firm—Bucknam and Archer

[57] ABSTRACT

A small toy aircraft is provided with an axial through opening, in which there are lodged two strings of adequate length, adapted to be anchored, preferably by means of a spring-clip, to a fixed point, placed at a suitable height, a lever, provided with a fork-shaped end, and one of the strings slides between the prongs of the fork. The strings may take a parallel or a divergent position so that the toy climbs up or slides downwardly to simulate a landing. The toy is provided with means for dropping a small cylinder which simulates a shell.

5 Claims, 7 Drawing Figures

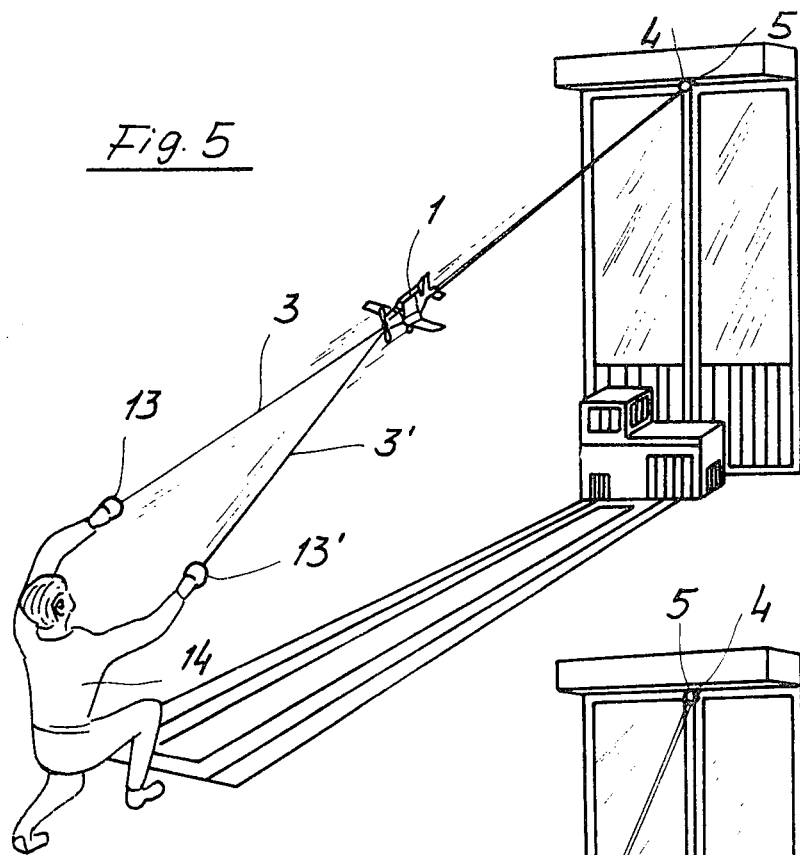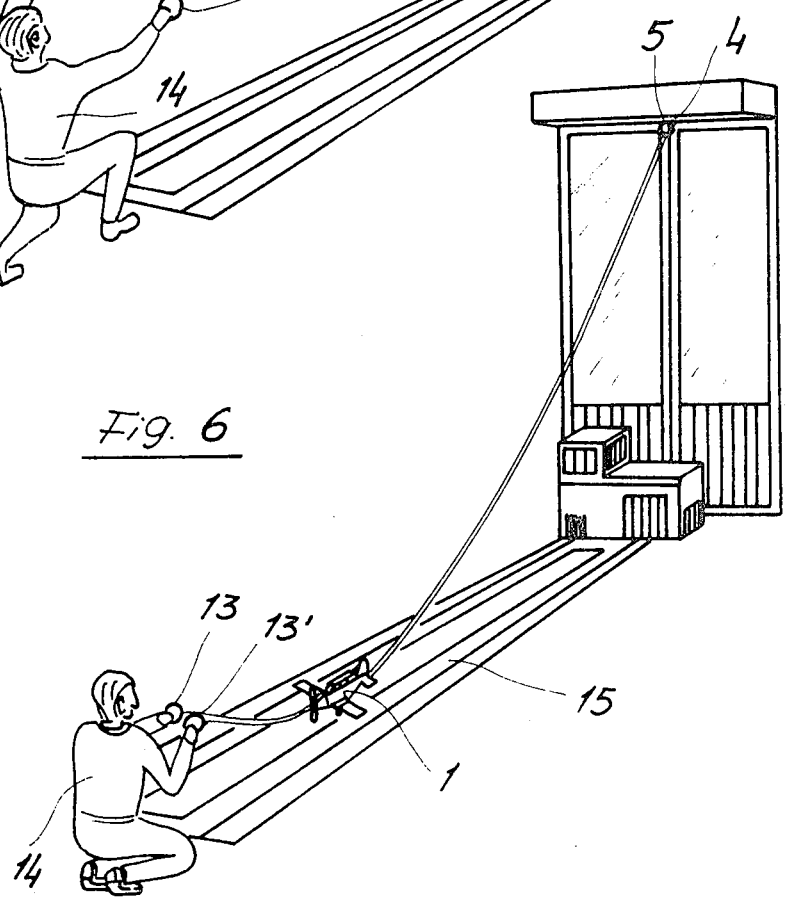

TOY AIRCRAFT

This invention relates to a small toy aircraft being so structurally built as to slide in both directions along a pair of suitably operable strings.

The toy aircraft according to the present invention may effect landing operations and simulate bombardment actions by dropping during the flight a small shell.

The said operating possibilities are carried out by developing a small toy aircraft, reproducing roughly and in a suitable scale a determined type of aircraft.

Such small toy aircraft is in particular provided with an axial through opening which constitutes a sliding guide, into which fits a pair of strings of suitable length.

The strings are anchored at one end to a fixed point, placed at an adequate height.

The same strings are provided at the opposite ends with two knobs which are manipulated by the used to take a parallel or a divergent position. This possibility ensures in practice to impart to the toy aircraft an upward thrust, when the strings are opened wide apart so as to cause the aircraft to climb up along the trajectory, defined by the strings themselves.

Conversely, by maintaining these strings parallel and giving them a more or less accentuated inclination, it is possible to have the aircraft dive and plane down.

Inside the toy aircraft of this invention there is further pivoted a lever provided with a fork-shaped end between the prongs of which slides one of the aforesaid strings.

Such lever is suitably provided with a tension spring and has at the opposite end an end portion, shaped like a hook.

The latter, cooperating with a stationary member by means of the tension spring maintains hooked a small shell, simulating an aircraft bomb and fitted with a proper anchoring ring.

Consequently, by arranging a knot on the string which goes through the prongs of the said fork, the downward sliding of the toy aircraft provokes an oscillation on opening of the fork itself, following the contact between the said knot and the fork prongs.

Such oscillation causes in practice a displacement of the hook retaining the said shell, causing the dropping of the shell itself.

These and further characteristic features of a functional and constructional nature of the small toy aircraft of this invention capable of sliding along a pair of strings will better be understood from the following detailed description, taken in conjunction with the figures on the accompanying drawings, in which:

FIG. 5 shows the re-climbing phase of the toy aircraft;

FIG. 6 represents the same toy aircraft in landing phase; and

Figure 1:
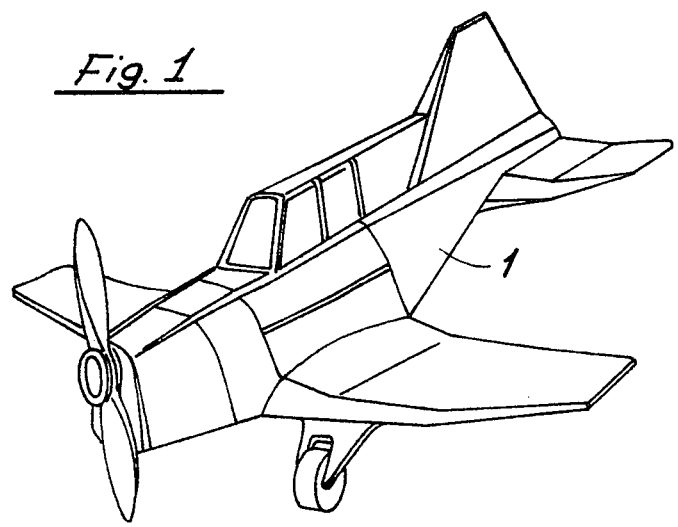
FIG. 1 shows the said toy aircraft in a perspective view.
Figure 2:
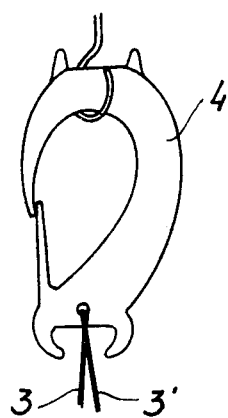
FIG. 2 represents a generic spring-clip, adapted to ensure the anchoring of an end of the two strings to a fixed point.

Referring now particularly to the figures on the accompanying drawings, the small toy aircraft 1 is provided with an axial through opening 2.

Inside said opening there is located a length of two strings 3 and 3' of adequate length, which may be anchored, preferably by means of a spring-clip 4 to a fixed point 5 at a suitable height.

One of the said strings slides in particular between the two prongs of a fork 6, formed at the upper end of a lever 7, pivoted at an intermediate point to the structure of the toy aircraft itself.

The said rod is provided with a tension spring 8 and projects with its opposite end from a slot, provided in the lower part of the toy aircraft.

The same end shows an end portion 9, shaped like a hook, which by pressing on the stationary member 10 by the action of the aforesaid spring, holds up a heavy small cylinder 11, which may be assimilated to an aircraft bomb and provided with a proper retaining ring 12.

The free ends of the strings 3 and 3' are anchored to so many knobs 13 and 13', which ensure to impart to the lengths of the strings lying before the toy aircraft 1 a divergent or parallel.

In the former case (FIG. 5) the toy aircraft is pushed upwardly flying high; in the latter case, it glides by gravity downwardly, following the trajectory imposed on it via the strings 3 and 3' by the boy 14.

It should by stressed here that by suitably acting on the same strings, lowering or raising and/or opening them apart, it is possible to simulate a perfect landing of the small toy aircraft, along a strip 15, specially arranged (FIG. 6).

Figure 7:
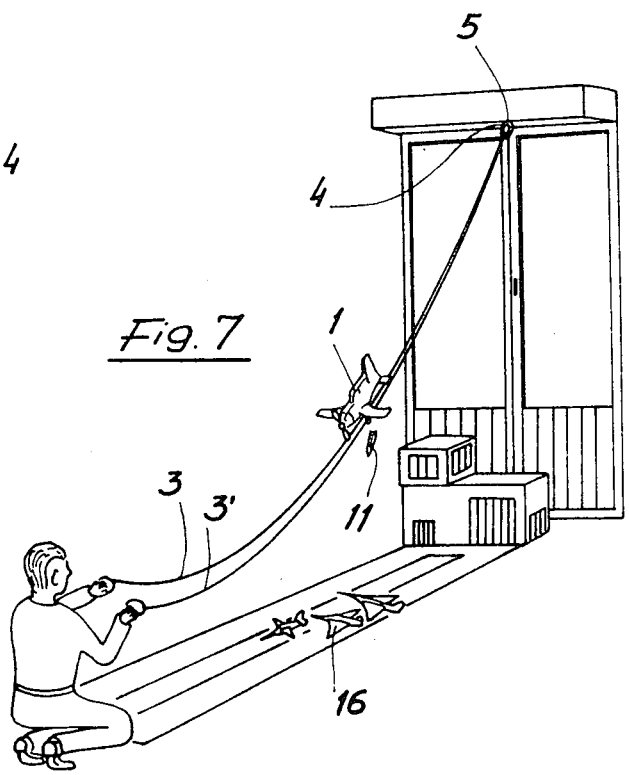
FIG. 7 shows the same toy aircraft in diving phase with dropping of the bomb on the hypothetical target.
Figure 3:
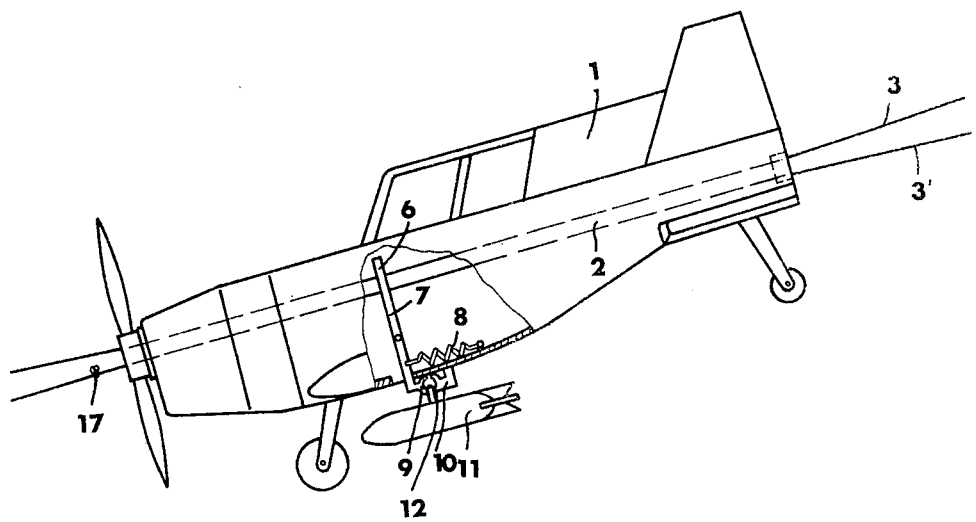
FIG. 3 shows designed a vertical section of the toy aircraft with a bomb adapted to be dropped.

Alternatively, it is possible to effect a diving operation (FIG. 7) with dropping of the shell 11 on an hypothetical target 16.

To this end, on the string passing between the prongs of the fork 6 there is formed in a suitable position a knot 17, being adequately dimensioned.

Figure 4:
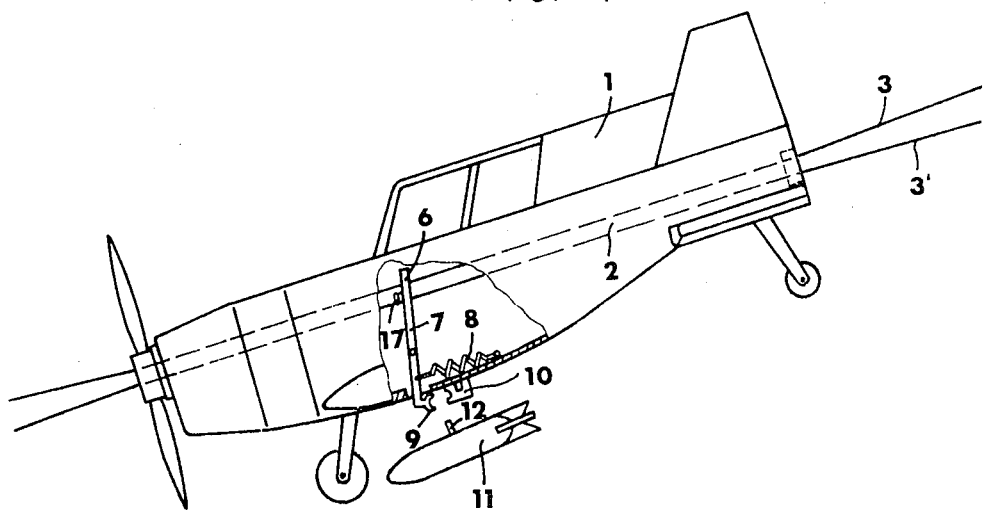
FIG. 4 represents the same section of the toy aircraft with the lever in bomb dropping position.

The passage of the said knot between the fork prongs provokes an oscillation of the lever 7, which, as depicted in FIG. 4, leaves the shell 11 free.

Such dropping operation takes place, obviously, not in the aircraft reclimbing phase, in view of the different sliding direction of the knot 17 relative to the fork 6.

What I claim is:

1. A small toy including an aircraft slidable on a pair of strings, the aircraft being provided with an axial through-opening, the strings going through said opening, the toy comprising means for anchoring one end of the strings to a fixed point placed at a suitable height, said strings serving as the means for manipulation of said aircraft by the user whereby said aircraft may be slid back and forth therealong, means on said aircraft for holding and releasing a projectile, said latter means including a pivoted lever having holding and releasing positions, the upper end of said lever having the shape of a fork, one string being positioned to slide between the prongs of said fork when the device is in use and means on said one string adapted to move said fork from said holding to said releasing position, said moving means being located at a particular location on said one string passing the fork in one direction of movement of the aircraft.

2. The toy according to claim 1 wherein said means for anchoring one end of said strings to a fixed point comprise a spring clip.

3. The toy according to claim 1 wherein said lever is provided with tension spring means and projects with its lower end from a slot, said lever is shaped as a hook at the lower end and the means for holding said projectile comprise a stationary member which engages with said tension spring means in said holding position.

4. A toy defined in claim 1, wherein said strings are provided at the free ends with knobs and the aircraft climbs upwardly when the strings are in a divergent position and descends when the strings are brought in a parallel position.

5. A toy as defined in claim 3, wherein the means for releasing said projectile comprise a knot on said string which goes through said fork, said knot being capable of provoking during the downward sliding of the toy aircraft itself a displacement of the fork, which imparts a displacement to said hook.

* * * * *